(No Model.) 3 Sheets—Sheet 1.
W. B. PATTERSON
CULTIVATOR.
No. 308,374. Patented Nov. 25, 1884.
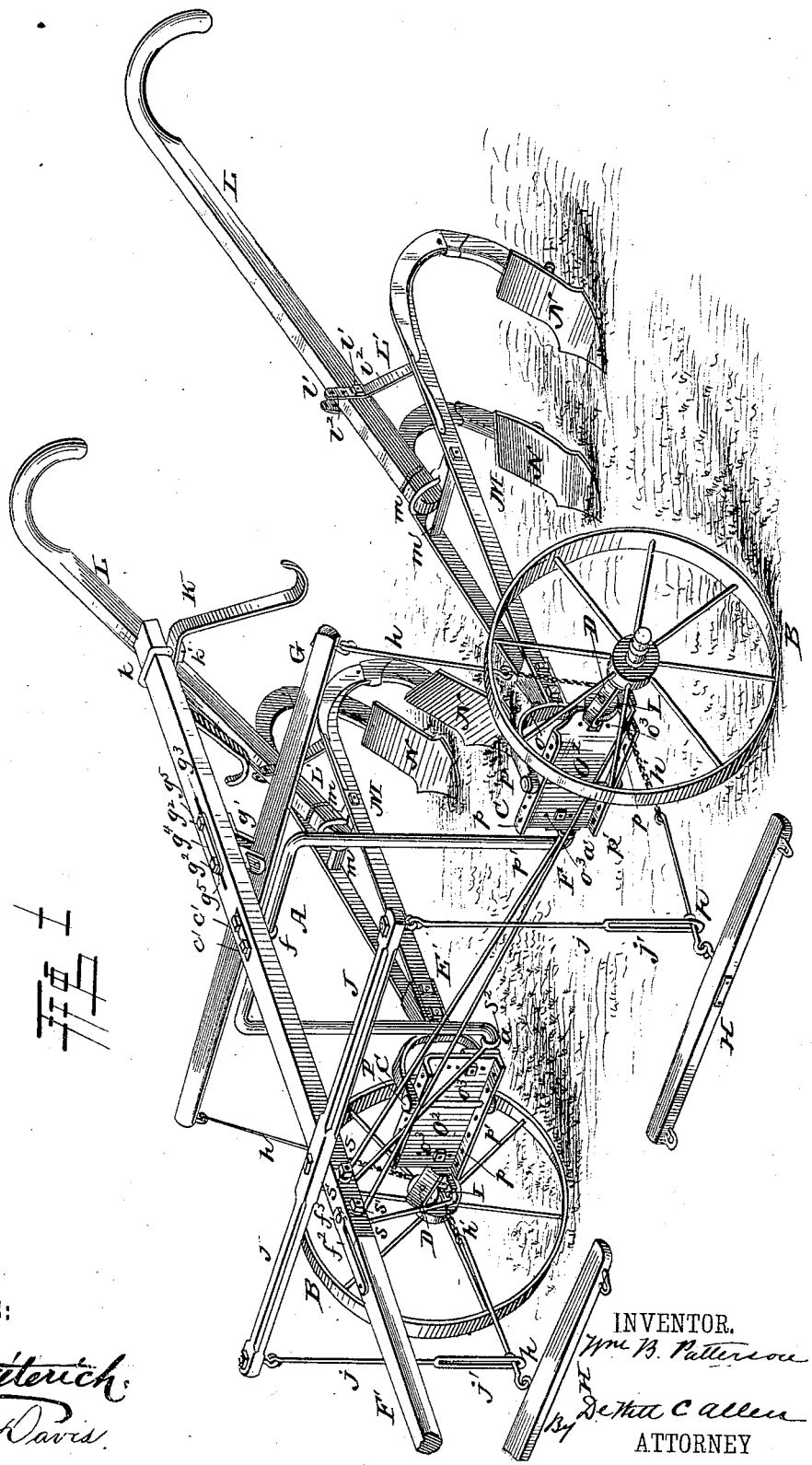
WITNESSES:
Fred. G. Dieterich
Wm. R. Davis
INVENTOR.
Wm. B. Patterson
By DeWitt C. Allen
ATTORNEY

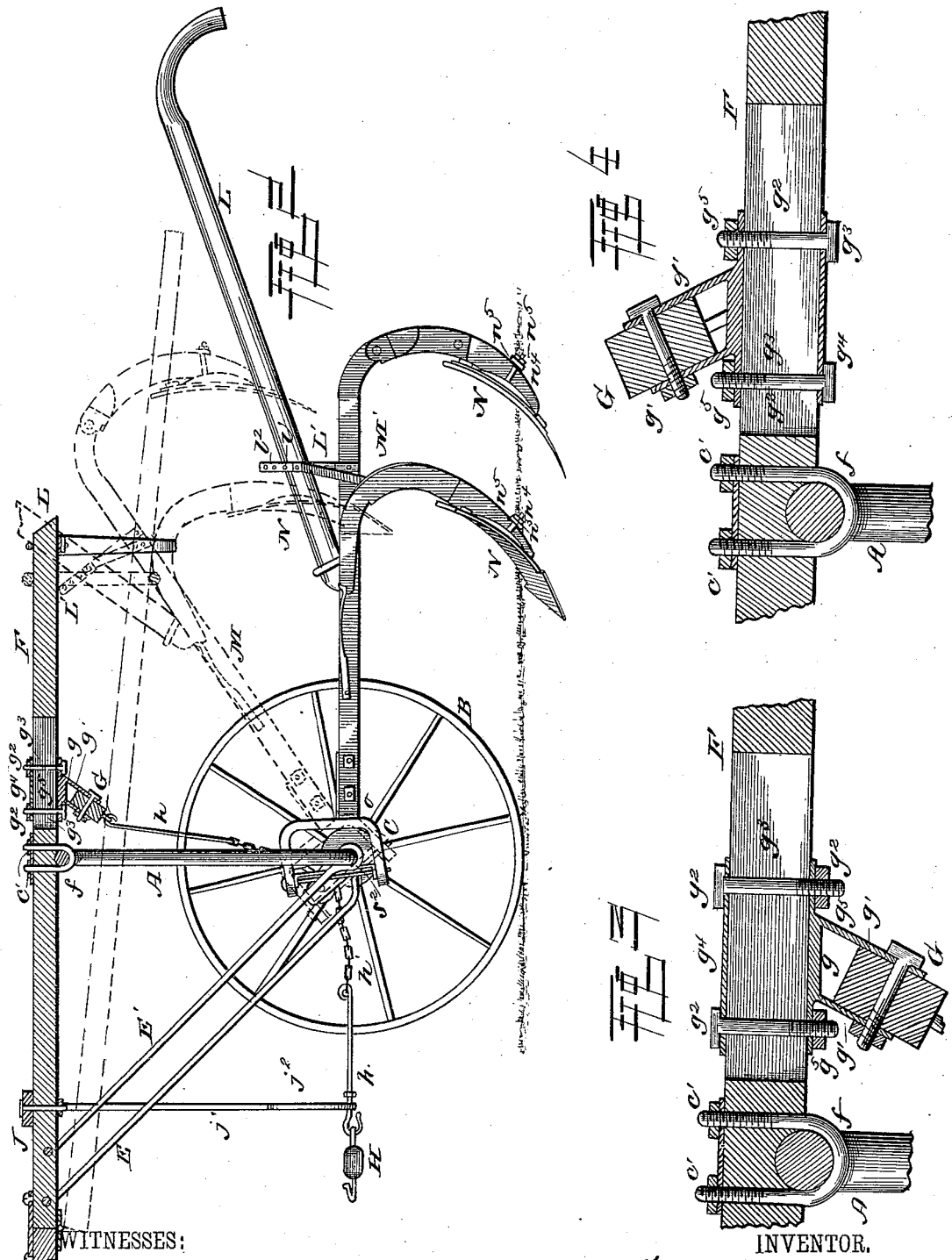

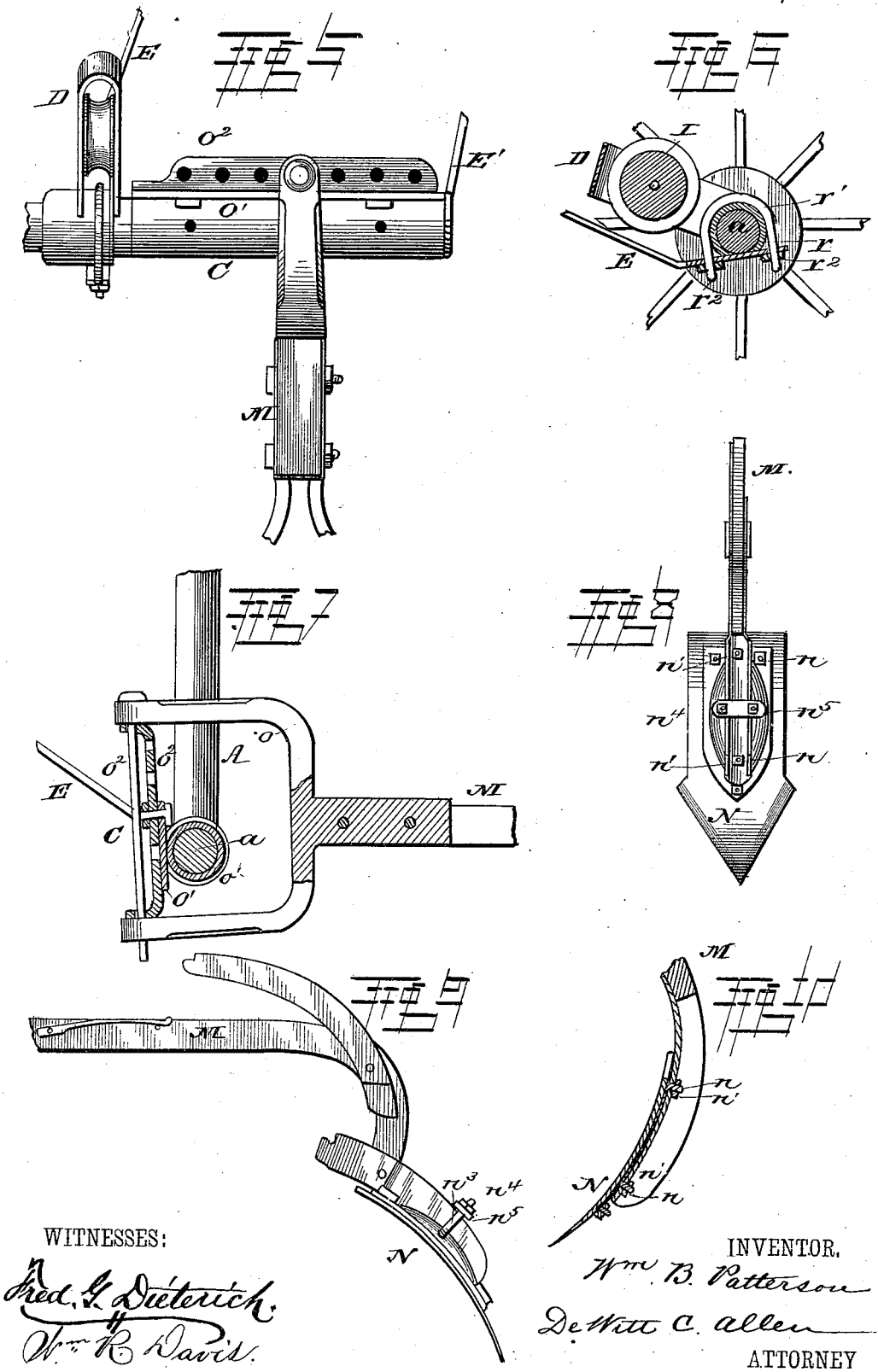

UNITED STATES PATENT OFFICE.

WILLIAM BELL PATTERSON, OF SECOR, ILLINOIS.

CULTIVATOR.

SPECIFICATION forming part of Letters Patent No. 308,374, dated November 25, 1884.

Application filed March 28, 1884. (No model.)

*To all whom it may concern:*

Be it known that I, WILLIAM BELL PATTERSON, of Secor, in the county of Woodford, and in the State of Illinois, have invented certain new and useful Improvements in Cultivators; and I do hereby declare that the following is a full, clear, and exact description thereof, reference being had to the accompanying drawings, and to the letters of reference marked thereon, making a part of this specification, and in which—

Figure 1 represents a view in perspective of my improved cultivator; Fig. 2, a longitudinal vertical central section; Figs. 3 and 4, enlarged detail vertical sections of the different positions in which the evener or double-tree may be located; Fig. 5, an enlarged detail view of devices for securing clevis and pulley to axle; Fig. 6, transverse vertical section through Fig. 5; Fig. 7, transverse vertical central section through Fig. 5; Figs. 8, 9, and 10, enlarged detail views of means for securing shovel to beam.

This invention relates to certain new and useful improvements in cultivators, having for its object the production of a cultivator in which the draft of the horses can be more fully equalized; in adjusting the weight on the tongue; in regulating the depth to which the shovels may enter the earth in cultivating corn; in regulating the width of the cultivator so that the shovels may throw the earth nearer to or farther from the corn, as may be deemed expedient, or in cultivating where the rows of corn are of different distances apart; and, finally, in various improvements combining simplicity and durability in construction; and to this end the invention consists in novel features of construction and combination and arrangement of parts, all as will be hereinafter fully described, and set forth in the claims hereto annexed.

In the drawings, A represents the usual arched axle, having right-angled lower ends, $a\ a$, upon which are mounted the supporting-wheels B B, the clevis-couplings C C, for connecting the cultivator-beams with said axle, the sheave or pulley frames D D, and the supporting-braces E E, all as will be hereinafter fully explained.

F F' represent the sectional tongue or pole, the rear section, F, being rigidly and centrally connected to the arched portion of the axle by a clip or yoke, $f$, embracing said axle and passing up through the tongue or pole and secured by screw-nuts C' in the usual manner. The front section, F', is hinged or pivotally connected to the rear section, F, so that it may be turned back and under the cultivator out of the way when not in use, thereby economizing in space when stored away, and which may be locked rigidly in position by the pivoted hook $f^2$ and pin $f^3$. As the tongue or pole is usually broken in front of the brace-supports by the horses stepping on it, or by other causes, the above-described construction permits of the front section being renewed at a very slight expense.

G represents the evener or double-tree, arranged in rear of the arched axle and pivoted between the inclined ears $g'\ g'$ of the plate $g$, said plate being connected to the tongue or pole by bolts $g^2$, passing up through a longitudinal slot, $g^3$, in said rear section, F, of the tongue or pole, and through an upper plate, $g^4$, and secured in position by screw-nuts $g^5$. By loosening up said nuts said plates, with the evener or double-tree, can be adjusted forward or backward on the tongue or pole to assist in adjusting the weight thereon, so as to rest light or heavy on the horses' necks, and when it is desired to cultivate deep the evener or double-tree should be set as far forward as possible, so that the heavy draft will not throw the tongue or pole up as much as if said evener or double-tree were fixed in the usual position for ordinary depth of cultivating. The pivoted evener or double-tree also assists in the adjustability of the single-trees H H, which are connected thereto by hooked rods $h$ and intermediate chains, $h'$, passing around pulleys I I, connected to the right-angled portions $a\ a$ of the axle in the manner hereinafter described. This adjustability of the evener or double-tree and single-trees enables the draft to be as nearly equal betweeen two horses as possible, enabling the leading horse to be farther in the lead than is usually the case, and without any great difference in the draft. The common hitch or stay-chain of the ordinary single-trees are generally too short, which objections are entirely obviated by the above-described construction. The evener or double-tree, while aiding the adjustability of the single-trees in respect to the relative forward or backward position of the single-trees, and also by its adjustability where it is connected to the tongue or pole, by means of which the tongue or pole rests light or heavy on the horses' necks, as before described, can also be placed on top of the tongue or pole, as shown in Fig. 4, instead of under it, as shown in Figs. 1 and 3. The object of this change is to get the evener or double-tree out of the way of tall corn, which can be readily accomplished by unbolting the plates and evener or double-tree and reversing them, as shown in Fig. 4. By reversing the plates end for end, as shown, the inclination of the evener or double-tree forward and backward is preserved, so that the chains have a straight pull on the evener or double-tree. This will enable the use of the cultivator to cultivate corn, some of which is quite tall, giving the stalks the full benefit of the arched axle. When the evener or double-tree is placed on top of the tongue or pole, it will be necessary to add a link or hook, in order to lengthen out the chains connecting the evener or double-tree with the single-trees. The single-trees H H and hooked rods $h$ are supported in front by pivoted slotted links $j\,j$, connecting them with the ends of a transverse bar, J, centrally and pivotally connected to the forward end of the rear section of the tongue or pole, all as clearly shown in Fig. 1, the slots $j'$ in the links $j\,j$ permitting the single-trees the necessary vertical play, while keeping them off of the rear legs of the horses, and also allowing the necessary play when one horse is in advance of the other or the horses are of different heights.

K represents a curved angular bar connected to the rear end of the rear section of the tongue or pole by a yoke, $k$, embracing said tongue or pole, and secured by screw-nuts $k'\,k'$ on the ends of said yoke, which pass through said plate, all as clearly shown in Figs. 1 and 2. Upon the curved ends of the plate K the cultivator-beams may be supported above the ground when not in use.

The above-described construction obviates the use of a single bolt passing through a hole in the tongue or pole, which tends to weaken it, but also obviates the loss of such bolts, which soon work loose.

L L represent the handles of the cultivator-beams M M, which are connected to said beams by yokes $m\,m$, embracing the lower ends of said handles and passing through the crossbars $m'\,m'$ of the beam, and secured by screw-nuts in the usual manner. By loosening up said nuts the handles can be made shorter or longer by pushing them farther through or drawing them farther out of the yokes. Said handles are also adjustably supported, so as to be raised higher or lower by bolts $l$, passing through the handles, and one of a series of holes, $l'$, in the straight portion $l^2$ of the inclined braces L', connected at their lower ends to said beams, and arranged at right angles to the handles, whereby they are rendered firm, and there is very little danger of the handles getting loose and giving way.

The cultivator-shovels are constructed and connected to the beams so as to be thrown back by means of a spring device (shown in Fig. 10) when striking a stone, stump, or other serious obstruction; but as this device is covered in a previous patent granted to myself July 10, 1883, and numbered 281,126, need not be further described, as it is not claimed.

The cultivator-shovels N are made adjustable, so that the point can be raised or lowered by means of bolts and set-screws $n\,n'$, near the heel and point of the shovels in grooves $n^2$ in the shovel-standards, all as clearly shown in Figs. 8 and 10, and the back of the shovel is supported or braced by a yoke and set-screws $n^3\,n^4$ and plate $n^5$, all as clearly shown in Figs. 8 and 9. This construction gives great strength to the shovels, while they will not so readily break, said yokes passing through the side walls of the grooved standard of the shovel and their ends through the plate $n^5$ and secured by the set-screws $n^4$.

On each of the right-angled parts $a\,a$ of the arched axle is connected and mounted a clevis-coupling, C, to which the forward ends of the cultivator-beams M are connected. These couplings are each composed of the coupling $o$ and the clevis-plates $O'\,O^2$, the plate $O'$ having a tubular portion, $o'$, and a vertical portion, $o^2$, connected or formed integral therewith, and the plate $O^2$ having two series of adjusting-holes $o^3$ arranged in vertical lines, and through one hole of each series and the portion $o^2$ passes a bolt, $o^4$, by which the plates $O'\,O^2$ are connected together and the plate $O^2$ adapted to be vertically adjustable for adjusting the cultivator beams and shovels, which allows for the wearing and shortening of the shovels, as well as to admit of deeper or shallower cultivating.

By the above-described construction none of the draft or strain comes on the nuts of the securing-bolts, as the plates $O'\,O^2$ are on the front sides of the parts $a\,a$ of the axle.

The two cultivator-beams M M are separated or brought nearer together by means of clevis-pins P P, which pass through the clevis or couplings $o$, and through one of a series of holes, $p$, of the transverse horizontal bottom and top flanges, $p'\,p'$, of the plates $O^2\,O^2$, the above-described construction of clevis-coupling being shown in Fig. 1, and enlarged detached views, Figs. 5 and 7.

The pulley-frames D D for the pulleys I I have each a tubular portion, $r$, partially or entirely surrounding the axle parts $a\,a$, and are secured thereto by yokes $r'\,r'$, embracing them, with their ends passing through the flattened lower ends of the braces E E, and secured by screw-nuts $r^2$, as clearly shown in Figs. 1 and 6. This forms a very strong and secure support both for the pulley-frames and the braces E E, the latter having their upper ends secured to the front end of the rear portion of the tongue or pole by a bolt and screw-nut, $s\ s'$. The braces $E'\ E'$ have eyes $s^2$ at their lower ends, which are mounted on the inner parts of the axles $a\ a$, while their upper ends are secured to the front end of the rear portion of the tongue or pole in the same manner as the braces $E\ E$, as shown in Figs. 1 and 2.

The operation of the cultivator being obvious, further description is deemed unnecessary.

Having thus fully described my invention, what I claim as new, and desire to secure by Letters Patent, is—

1. In a cultivator, the combination of the slotted tongue or pole, plate $g$, having ears $g'\ g'$, and plate $g^4$, adapted to be changed and reversible above and below the tongue or pole, as described, pivoted double-tree and single-trees connected by links and intermediate chains passing under pulleys, all arranged and operating substantially in the manner as and for the purpose specified.

2. In a cultivator, the combination, with the slotted tongue or pole, of the longitudinally-adjustable double-tree or evener arranged in rear of the arched axle, the single-trees, and mechanism connecting said double-tree or evener and single-trees, and supporting-links and pivoted transverse bar arranged in front of said axle, substantially in the manner as and for the purpose herein shown and described.

3. In a cultivator, the combination, with the cultivator beams and handles, of the devices for adjustably connecting them together, consisting of the yokes $m\ m$ and securing-nuts, and the plates $L'\ L'$, having a series of adjusting-holes arranged at right angles to said handles and the securing-bolts, substantially in the manner herein shown and described.

4. In a cultivator, the combination, with the axle part $a\ a$, of the clevis-plate $O'$, having tubular portion $o'$ and vertical portion $o^2$ and clevis-plate $O^2$, and mechanism for connecting said plates together, substantially in the manner herein shown and described.

5. The combination, with the axle part $a$, of the clevis-plate $O'$, having tubular portion $o'$ and vertical portion $o^2$, and clevis-plate $O^2$, having the two series of adjusting-holes $o^3$ and the securing bolts $o^4$, substantially in the manner as and for the purpose herein shown and described.

6. In a cultivator, the combination, with the axle part $a$ and cultivator-beam, of the intermediate clevis-coupling, $C$, composed of the coupling $o$, clevis-plate $O'$, having tubular portion $o'$ and vertical portion $o^2$, and the flanged clevis-plate having two series of adjusting-holes, $o^3$ and $p$, and securing bolts and pins $o^4$ and $P$, substantially in the manner as and for the purpose herein shown and described.

7. The combination, with the brace $E$ and axle part $a$, of the yoke $r'$ and securing-nuts $r^2$, and the pulley-frame $D$, having the tubular portion $r$, substantially as herein shown and described.

In testimony that I claim the foregoing I have hereunto set my hand this 5th day of March, 1884.

WM. BELL PATTERSON.

Witnesses:
 THOS. SLADE,
 S. R. GRIFFITH.